(12) United States Patent
Kamata

(10) Patent No.: US 8,466,740 B2
(45) Date of Patent: Jun. 18, 2013

(54) RECEIVING CIRCUIT, LSI CHIP, AND STORAGE MEDIUM

(75) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 22 days.

(21) Appl. No.: 13/282,795

(22) Filed: Oct. 27, 2011

(65) Prior Publication Data

US 2012/0105130 A1     May 3, 2012

(30) Foreign Application Priority Data

Oct. 29, 2010    (JP) ................................ 2010-243220

(51) Int. Cl.
    *H01L 29/93*     (2006.01)
(52) U.S. Cl.
    USPC .............................. 327/586; 327/61; 327/194
(58) Field of Classification Search
    None
    See application file for complete search history.

(56) References Cited

U.S. PATENT DOCUMENTS

| | | | | |
|---|---|---|---|---|
| 5,243,163 | A * | 9/1993 | Dauge ............................ | 219/760 |
| 5,731,856 | A | 3/1998 | Kim et al. | |
| 5,744,864 | A | 4/1998 | Cillessen et al. | |
| 6,294,274 | B1 | 9/2001 | Kawazoe et al. | |
| 6,563,174 | B2 | 5/2003 | Kawasaki et al. | |
| 6,727,522 | B1 | 4/2004 | Kawasaki et al. | |
| 7,049,190 | B2 | 5/2006 | Takeda et al. | |
| 7,061,014 | B2 | 6/2006 | Hosono et al. | |
| 7,064,346 | B2 | 6/2006 | Kawasaki et al. | |
| 7,105,868 | B2 | 9/2006 | Nause et al. | |
| 7,211,825 | B2 | 5/2007 | Shih et al. | |
| 7,282,782 | B2 | 10/2007 | Hoffman et al. | |
| 7,297,977 | B2 | 11/2007 | Hoffman et al. | |
| 7,323,356 | B2 | 1/2008 | Hosono et al. | |
| 7,385,224 | B2 | 6/2008 | Ishii et al. | |
| 7,402,506 | B2 | 7/2008 | Levy et al. | |

(Continued)

FOREIGN PATENT DOCUMENTS

| EP | 1 737 044 A1 | 12/2006 |
|---|---|---|
| EP | 2 226 847 A2 | 9/2010 |

(Continued)

OTHER PUBLICATIONS

Asakuma, N. et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

(Continued)

*Primary Examiner* — An Luu
(74) *Attorney, Agent, or Firm* — Fish & Richardson P.C.

(57) ABSTRACT

A receiving circuit with a simple circuit structure for performing wireless communication utilizing electromagnetic induction is provided. An LSI chip and a storage medium where wireless communication utilizing electromagnetic induction is performed and the circuit scale and circuit size can be reduced are provided. The following receiving circuit may be used: a parallel circuit where two diode elements whose directions are opposite are connected in parallel is used, one end of the parallel circuit is connected to the other end of a coil whose one end is connected to a ground potential line, and a capacitor is connected in series with the other end of the parallel circuit. A transistor whose leakage current is markedly reduced may be used as a diode in the receiving circuit. Such a receiving circuit may be used in an LSI chip or a storage medium.

5 Claims, 11 Drawing Sheets

U.S. PATENT DOCUMENTS

| | | |
|---|---|---|
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,768,790 B2 | 8/2010 | Kuroda et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0142513 A1* | 7/2003 | Vinciarelli .................. 363/17 |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Covan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-228981 A | 8/2005 |
| WO | 2004/114391 A1 | 12/2004 |

OTHER PUBLICATIONS

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using Castep," Zeitschrift fur Kristallographie, 2005, vol. 220, pp. 567-570.

Coates. D et al., Optical Studies of the Amorphous Liquid-Cholesteric Liquid Crystal Transition: The "Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In-Ga-Zn-O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In-Ga-Zn-Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In-Ga-Zn-Oxide TFT," AM-FPD '09 Digest of Technical Papers, Jul. 1, 2009, pp. 41-44.

Hayashi, R et al., "42.1: Invited Paper: Improved Amorphous In-Ga-Zn-O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTS) for AMLCDS," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda., T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium-Gallium-Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N. et al., "Spinel,YBFE2O4, and YB2FE3O7 Types of Structures for Compounds in the IN2O3 and SC2O3-A2O3-BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on the Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3-Ga2ZnO4-ZnO system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

Nowatari, H et al., "60.2: Intermediate Connector with Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In-Ga-Zn-Oxide TFTs With a Novel Passivation Layer," SID Digest '09 : SID International Symposium Digest of Technical Papers, May 31, 2009, pp. 284-287.

Ohara, H et al., "Amorphous In-Ga-Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In-Ga-Zn-Oxide TFT," SID Digest '09 : SID International Symposium Digest of Technical Papers, May 31, 2009, pp. 184-187.

Osada, T et al., "Development of Driver-Integrated Panel Using Amorphous In-Ga-Zn-Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium-Gallium-Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display with Driver Circuit Using Amorphous In-Ga-Zn-Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3-In2O3-ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

\* cited by examiner

RECEIVING CIRCUIT, LSI CHIP, AND STORAGE MEDIUM

BACKGROUND OF THE INVENTION

1. Field of the Invention

The present invention relates to receiving circuits used for wireless communication utilizing electromagnetic induction. The present invention relates to LSI (semiconductor integrated circuit) chips capable of performing wireless communication utilizing electromagnetic induction. The present invention relates to storage media capable of performing wireless communication utilizing electromagnetic induction.

2. Description of the Related Art

An electronic circuit for performing wireless communication utilizing electromagnetic induction by a combination of a semiconductor element such as an LSI chip and a coil has been proposed (Reference 1). For example, the electronic circuit disclosed in Reference 1 can perform communication between LSI chips or between an electronic device and an LSI chip and is expected to be applied to an LSI layering technology, an IC chip, or the like.

For example, in the case where a plurality of LSI chips are stacked and electrically connected, conventionally, a technique by which LSI chips are connected to each other by a connection method such as wire bonding and a technique by which LSI chips are connected to each other by physical formation of a communication path that penetrates the chips themselves and is called a through hole are known. However, these techniques increase cost because advanced wiring connection steps are needed. Further, there are physical limits for obtaining a layered structure of many layers. In the conventional method, a defect such as poor connection in a connection portion is one of the causes of a decrease in yield or reliability.

However, by electrically connecting stacked LSI chips or adjacent LSI chips to each other through wireless communication, complex wiring connection steps are not needed. Thus, the decrease in yield or reliability caused in the wiring connection steps is suppressed, so that a circuit can be easily made large and highly integrated at low cost.

Such a technique of wireless communication utilizing electromagnetic induction can be applied to a small IC chip, a storage medium such as a flash memory, or the like. By application of this technique to the storage medium or the like, an area can be markedly reduced by elimination of an exposed portion of a contact electrode that has been needed; thus, further reduction in the size of the storage medium is expected. In addition, since the exposed electrode is not needed, the IC chip or the storage medium can be covered with resin or the like and be totally waterproof Further, a slot into which a storage medium is inserted can be eliminated from an electronic device. In the above manner, advantageous effects are expected in various aspects.

Here, the structure and operation of the conventional receiving circuit used for wireless communication utilizing electromagnetic induction are described with reference to FIG. 10 and FIGS. 11A to 11C. FIG. 10 is a circuit diagram illustrating a structure example of part of a transmitting circuit and the conventional receiving circuit.

FIGS. 11A to 11C are examples of timing charts at the time when signals are transmitted and received.

A transmitting circuit 10 includes a coil 11. One terminal of the coil 11 is connected to a ground potential line, and a transmitting signal TXDATA is input from the other terminal of the coil 11. A receiving circuit 20 includes a coil 21, two comparators (a comparator 23a and a comparator 23b), and a latch circuit 25 including NAND circuit elements. One terminal of the coil 21 is connected to a ground potential line, and the other terminal of the coil 21 is connected to an inversion input terminal (hereinafter also referred to as a−terminal (a minus terminal)) of the comparator 23a and a non-inversion input terminal (hereinafter also referred to as a+terminal (a plus terminal)) of the comparator 23b. Reference voltage VH and reference voltage VL are input to a+terminal of the comparator 23a and a−terminal of the comparator 23b, respectively. Voltage which is higher than 0 V and voltage which is lower than 0 V are used as the reference voltage VH and the reference voltage VL, respectively. Output terminals of the comparators 23a and 23b are connected to the latch circuit 25, and a receiving signal RXDATA is output from the latch circuit 25.

Here, in order to clearly show the relative position of the two coils of the transmitting circuit 10 and the receiving circuit 20, black circles are shown at one ends of the coils in FIG. 10. Specifically, in the case where a coupling factor is positive, it is assumed that the direction of current with respect to one end of the coil on a primary side at which the black circle is shown is the same as the direction of current with respect to one end of the coil on a secondary side at which the black circle is shown. Note that in this structure, a coupling factor between the two coils is assumed to be positive.

Next, reception operation is described with reference to FIG. 10 and timing charts in FIGS. 11A to 11C. FIG. 11A illustrates transition of the voltage of the transmitting signal TXDATA over time. FIG. 11B illustrates transition of a potential difference VR generated between both ends of the coil 21 over time. FIG. 11C illustrates transition of the voltage of the receiving signal RXDATA over time. Here, the level of VR is equal to the level of voltage input to the−terminal of the comparator 23a and the +terminal of the comparator 23b under the condition that the direction of the one end of the coil 21 in FIG. 10 at which the black circle is shown is positive.

When the voltage of TXDATA fluctuates between high-level voltage and low-level voltage, the potential difference VR is generated in the coil 21 by an electromagnetic induction phenomenon, so that a pulsed voltage waveform as illustrated in FIG. 11B is obtained. When VR exceeds the upper limit voltage VH input to the comparator 23a, high-level voltage is output as the output voltage RXDATA from the latch circuit 25. In contrast, when VR is below the lower limit voltage VL input to the comparator 23b, RXDATA is inverted and low-level voltage is output. The latch circuit 25 holds the last output voltage until the voltage of TXDATA is changed.

With the structure and the operation method, the receiving circuit 20 receives the transmitting signal TXDATA from the transmitting circuit 10 and can restore the transmitting signal TXDATA as the receiving signal RXDATA.

[Reference]

Reference 1: Japanese Published Patent Application No. 2005-228981

SUMMARY OF THE INVENTION

In the structure example of the conventional receiving circuit, the two comparators and the two NAND circuit elements are used. Further, although not illustrated here, two constant voltage power supply circuits for generating the reference voltage VH and the reference voltage VL are needed. In this manner, not only the conventional receiving circuit with the above structure but also another conventional receiving circuit has large circuit scale, and it is difficult to reduce the circuit scale and circuit size and to highly integrate the circuit.

The present invention is made in view of the technical background. Thus, it is an object of one embodiment of the present invention to provide a receiving circuit with a simple circuit structure for performing wireless communication utilizing electromagnetic induction. It is an object of one embodiment of the present invention to provide an LSI chip and a storage medium where wireless communication utilizing electromagnetic induction is performed and the circuit scale and circuit size can be reduced.

In order to achieve the object, in the present invention, a receiving circuit with the following circuit structure may be used: a comparator and a latch circuit that increase the circuit scale are not used, data on the direction of voltage generated between both ends of a receiving coil is output as a voltage signal, and the data can be retained until the direction of the voltage is inverted. Specifically, the following receiving circuit is used: a parallel circuit where two diode elements whose directions are opposite are connected in parallel is used, one end of the parallel circuit is connected to the other end of a coil whose one end is connected to a ground potential line, and a capacitor is connected in series with the other end of the parallel circuit.

In other words, one embodiment of the present invention is a receiving circuit that includes a parallel circuit where two diode elements whose directions are opposite are electrically connected in parallel; a coil whose one end is electrically connected in series with one end of the parallel circuit and the other end is grounded; a capacitor whose one end is electrically connected in series with the other end of the parallel circuit and the other end is grounded; and a comparison circuit for detecting voltage of a node to which the parallel circuit and the capacitor are connected.

When voltage generated in the coil is applied to the parallel circuit including the two diode elements and a potential difference which is higher than the threshold voltage of the diode element is generated between both ends of the parallel circuit, current flows from the high-voltage side of the end of the parallel circuit to the low-voltage side of the end of the parallel circuit, and the voltage is held in the capacitor connected in series with the parallel circuit. Then, when application of voltage to the parallel circuit is stopped, current flows to the parallel circuit by the voltage held in the capacitor in a direction that is opposite to the direction of the current. However, when the potential difference generated between both of the ends of the parallel circuit is lower than the threshold voltage of the diode element, supply of the current is stopped and voltage whose level is close to the level of the threshold voltage is held in a node between the parallel circuit and the capacitor. Here, the positive or negative voltage held depends on the positive or negative voltage applied to the parallel circuit. In the case where positive voltage is generated in the coil, positive voltage is held in the node. In the case where negative voltage is generated in the coil, negative voltage is held in the node.

Thus, data on the direction of voltage generated in the coil is held as the positive or negative voltage held in the node between the parallel circuit and the capacitor. When a comparison circuit or the like for determining the positive or negative voltage is connected to the node, for example, and the held voltage is amplified to desired voltage, a receiving signal can be generated by restoration of a transmitting signal from a transmitting circuit.

One embodiment of the present invention is a receiving circuit where the two diode elements are each formed using a transistor and a semiconductor layer used for a channel of the transistor includes an oxide semiconductor.

A transistor whose one of a source and a drain is connected to a gate is used as a diode element used in a receiving circuit of the present invention. An oxide semiconductor is used for a semiconductor layer used for a channel of the transistor. A transistor which is formed through appropriate steps and includes an oxide semiconductor has extremely low leakage current in an off state, and leakage of electrical charge held in the node between the parallel circuit and the capacitor can be markedly reduced. With the use of the transistor having such a feature for the diode element, the size of the capacitor used in the receiving circuit and the circuit size can be reduced. Further, since a capacitance component is decreased, the time required for charging and discharging is shortened and the receiving circuit can be applied to a high-frequency signal. Furthermore, voltage can be held in the node for an extremely long time because leakage from the diode element is extremely small. Thus, the receiving circuit can be applied to an extremely low-frequency signal.

One embodiment of the present invention is an LSI chip that performs wireless communication utilizing electromagnetic induction and includes the receiving circuit.

One embodiment of the present invention is a storage medium that performs wireless communication utilizing electromagnetic induction and includes the receiving circuit.

By mounting a receiving circuit in one embodiment of the present invention on an LSI chip, it is possible to provide an LSI chip where wireless communication utilizing electromagnetic induction can be performed between stacked chips and the circuit scale and chip size are reduced. By mounting a receiving circuit in one embodiment of the present invention on a storage medium such as a memory card, it is possible to obtain a storage medium where wireless communication with an electronic device can be performed and the circuit scale and circuit size are reduced.

According to the present invention, it is possible to provide a receiving circuit with a simple circuit structure for performing wireless communication utilizing electromagnetic induction. Further, with the use of the receiving circuit, it is possible to provide an LSI chip and a storage medium where wireless communication utilizing electromagnetic induction is performed and the circuit scale and circuit size can be reduced.

DETAILED DESCRIPTION OF THE INVENTION

Figure 1:
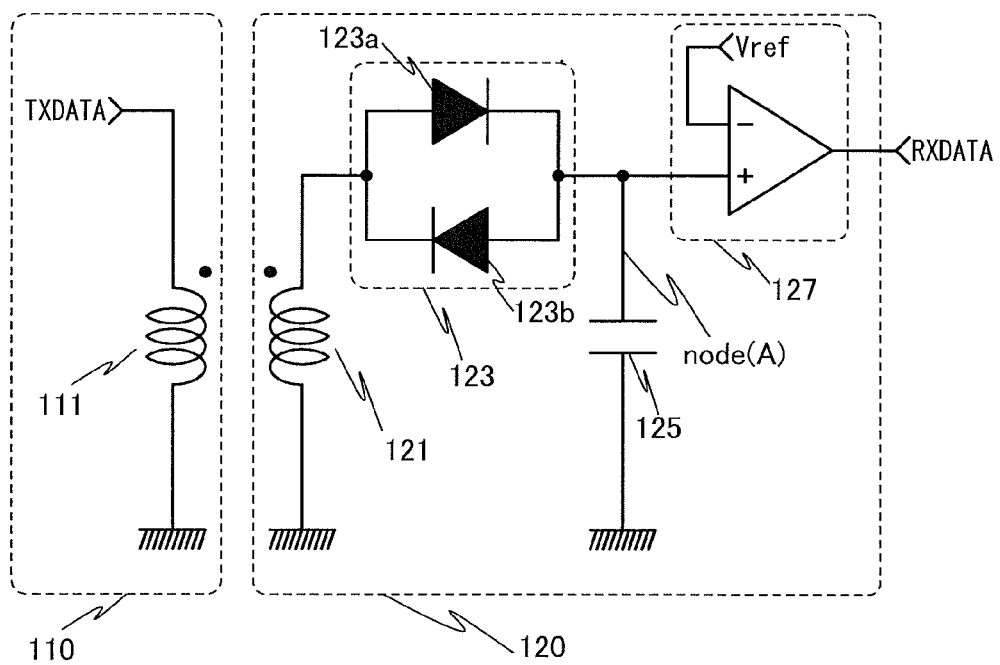
FIG. 1 illustrates a receiving circuit in one embodiment of the present invention.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments. Note that in structures of the present invention described below, the same portions or portions having similar functions are denoted by the same reference numerals in different drawings, and description thereof is not repeated.

Note that in each drawing described in this specification, the size, the layer thickness, or the region of each component is exaggerated for clarity in some cases. Thus, embodiments of the present invention are not limited to such scales.

A transistor is a kind of semiconductor elements and can perform amplification of current or voltage, switching operation for controlling conduction or non-conduction, or the like. A transistor in this specification includes an insulated-gate field-effect transistor (IGFET) and a thin film transistor (TFT).

Functions of a "source" and a "drain" might interchange when a transistor of opposite polarity is used or the direction of current flow is changed in circuit operation, for example. Thus, in this specification, the terms "source" and "drain" can interchange.

In this specification and the like, one of a source and a drain of a transistor is referred to as a "first electrode" and the other of the source and the drain is referred to as a "second electrode" in some cases. Note that in that case, a gate is also referred to as a "gate" or a "gate electrode".

Note that in this specification and the like, two electrodes of a diode element are referred to as a "first electrode" and a "second electrode" or a "first terminal" and a "second terminal" in some cases. Here, a direction in which current flows from the first electrode to the second electrode is a forward direction of the diode element and its opposite direction is an opposite direction of the diode element. In addition, one of the electrodes is simply referred to as a "terminal", "one end", "one", or the like in some cases.

In this specification and the like, two electrodes of a coil are referred to as a "first electrode" and a "second electrode" or a "first terminal" and a "second terminal" in some cases. In addition, one of the electrodes is simply referred to as a "terminal", "one end", "one", or the like in some cases.

In this specification and the like, the term "electrically connected" includes the case where components are connected to each other through an object having any electric action. Here, there is no particular limitation on an object having any electric action as long as electric signals can be transmitted and received between components that are connected to each other through the object. Examples of an "object having any electric action" include a switching element such as a transistor, a resistor, a coil, a capacitor, and an element with a variety of functions in addition to an electrode and a wiring.

Note that in this specification and the like, a node is an element (e.g., a wiring) which enables electrical connection between elements included in a circuit. Thus, a "node to which A is connected" is a wiring which is electrically connected to A and can be regarded as having the same potential as A. Note that even when one or more elements which enable electrical connection (e.g., switches, transistors, capacitors, inductors, resistors, or diodes) are inserted in a portion of the wiring, the wiring can be regarded as the "node to which A is connected" as long as it has the same potential as A.

(Embodiment 1)

In this embodiment, a receiving circuit in one embodiment of the present invention is described with reference to FIG. 1 and FIGS. 2A to 2D. FIG. 1 is a circuit diagram illustrating a structure example of part of a transmitting circuit and a receiving circuit in this embodiment. FIGS. 2A to 2D are examples of timing charts at the time when signals are transmitted and received.

<Example of Circuit Structure>

First, circuit structures of a transmitting circuit 110 and a receiving circuit 120 in this embodiment are described with reference to FIG. 1.

The transmitting circuit 110 has a function of transmitting a transmitting signal with the use of a coil. The transmitting circuit 110 in this embodiment includes a coil 111. One terminal of the coil 111 is connected to a ground potential line, and a transmitting signal TXDATA is input to the other terminal of the coil 111. Note that although the one terminal of the coil 111 is grounded in this embodiment, this embodiment is not limited to this structure. The one terminal of the coil 111 may be connected to a different functional element, a circuit, or the like.

The receiving circuit 120 in this embodiment includes a coil 121, a parallel circuit 123, a capacitor 125, and a comparison circuit 127.

The parallel circuit 123 includes a diode element 123a and a diode element 123b. These diode elements whose directions are opposite are connected in parallel. The diode element 123a and the diode element 123b only need to have positive threshold voltage Vth and do not necessarily have the same characteristics. It is known that Vth of a silicon diode is approximately 0.7 V and that Vth of a germanium diode is approximately 0.2 V. In the case where a transistor whose gate and one of a source and a drain are connected to each other is used as each of the diode element 123a and the diode element 123b, the level of Vth can be set to a given level by steps of manufacturing a transistor. Here, the threshold voltage of the diode element 123a is referred to as Vth(a), and the threshold voltage of the diode element 123b is referred to as Vth(b).

A potential difference is generated between both ends of the coil 121 by an electromagnetic induction phenomenon in accordance with a signal output from the coil 111 in the transmitting circuit 110. In this embodiment, one terminal of the coil 121 is connected to a ground potential line, and the other terminal of the coil 121 is connected to the parallel circuit.

Here, in order to clearly show the relative position of the coil 111 and the coil 121, black circles are shown in one terminals of the coils in FIG. 1. Specifically, in the case where a coupling factor is positive, it is assumed that the direction of current flowing from the coil 111 with respect to the one terminal in which the black circle is shown is the same as the direction of current flowing from the coil 121 with respect to the one terminal in which the black circle is shown. Note that in this embodiment, a coupling factor between the coils is assumed to be positive.

The capacitor 125 has a function of holding the voltage of a node between the parallel circuit 123 and the comparison circuit 127. One electrode of the capacitor 125 is connected to a ground potential line, and the other electrode of the capacitor 125 is connected to the parallel circuit and the comparison circuit. Here, the node between the parallel circuit 123 and the comparison circuit 127 is referred to as a node (A).

The comparison circuit 127 has a function of comparing the voltage of the node (A) with reference voltage Vref and outputting a receiving signal RXDATA based on the comparison result. In this embodiment, a comparator is used as the comparison circuit 127, a+terminal of the comparator is connected to the node (A), and the reference voltage Vref is input to a−terminal of the comparator. Here, the reference voltage Vref may be set lower than Vth(b) and higher than−Vth(a). The reference voltage Vref is preferably set to a median value of these threshold voltages. For example, in the case where Vth(a) and Vth(b) are equal, 0 V may be used as Vref. The structure of the comparison circuit 127 is not limited to this structure. Any structure may be used as the structure of the comparison circuit 127 as long as at least the above object can be achieved.

<Operation Example of Circuit>

Figure 2A:
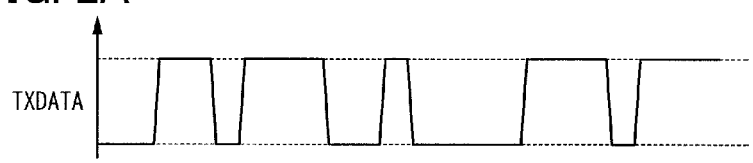
FIGS. 2A to 2D are timing charts at the time when signals are transmitted and received in one embodiment of the present invention.
Figure 2B:
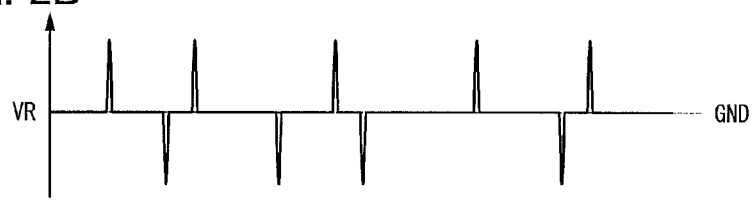
Figure 2C:
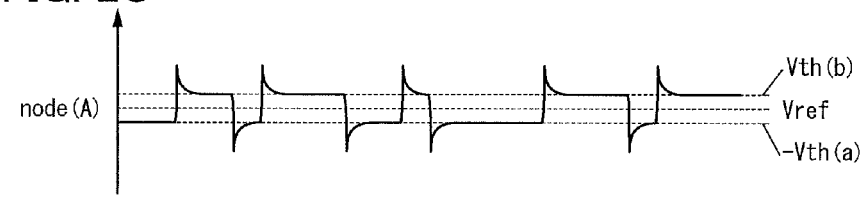
Figure 2D:
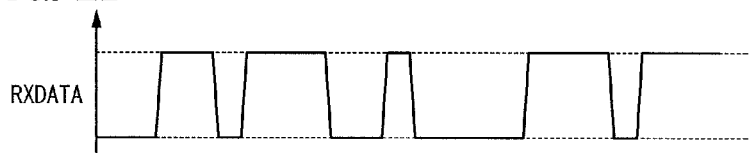

Next, circuit operation at the time of receiving a signal is described with reference to FIG. 1 and FIGS. 2A to 2D. FIG. 2A illustrates transition of the transmitting signal TXDATA output to the coil 111 in the transmitting circuit 110 over time. FIG. 2B illustrates transition of the potential difference VR generated between both of the ends of the coil 121 over time. FIG. 2C illustrates transition of the voltage of the node (A) over time. FIG. 2D illustrates transition of the receiving signal RXDATA output from the comparison circuit 127 over time. Here, the level of VR is equal to the level of the voltage of a node between the parallel circuit 123 and the coil 121 under the condition that the direction of the one end of the coil 121 in FIG. 1 at which the black circle is shown is positive.

First, the case where the voltage of TXDATA is changed from low-level voltage into high-level voltage is described. While the voltage of TXDATA is changed into high-level voltage, the potential difference VR is generated between both of the ends of the coil 121 by an electromagnetic induction phenomenon. As described above, since the coupling factor between the coil 111 and the coil 121 is positive, VR has a positive pulsed waveform as illustrated in FIG. 2B.

When positive voltage is applied to a node of the parallel circuit 123 on the coil 121 side, current flows to the node (A) through the diode element 123a connected in a forward direction with respect to the direction of the voltage, and the voltage of the node (A) is increased.

Then, after VR converges at 0 V, current flows from the node (A) whose voltage is high to the coil 121 through the diode element 123b, so that the voltage of the node (A) is decreased. In contrast, current does not flow to the diode element 123a whose connection direction is opposite to the direction of the voltage. The diode element 123b is set to be in an off state when the voltage of the node (A) is below the threshold voltage Vth(b) of the diode element 123b, supply of current is stopped, and voltage whose level is close to the level of Vth(b) is held in the node (A).

The comparison circuit 127 compares the voltage of the node (A) with the reference voltage Vref and outputs RXDATA based on the comparison result. The comparison circuit 127 in this embodiment outputs high-level voltage in the case where the voltage of the node (A) is higher than the reference voltage Vref.

Next, the case where the voltage of TXDATA is changed from high-level voltage into low-level voltage is described. While the voltage of TXDATA is changed from high-level voltage into low-level voltage, the potential difference VR whose direction is opposite to the direction of the potential difference is generated in the coil 121 by an electromagnetic induction phenomenon in a pulsed manner. In other words, the negative voltage VR is applied to the node of the parallel circuit 123 on the coil 121 side.

When negative voltage is applied to the node of the parallel circuit 123 on the coil 121 side, current flows from the node (A) to the coil side through the diode element 123b, so that the voltage of the node (A) is decreased.

Then, after VR converges, current flows from the coil 121 side to the node (A) whose voltage is low through the diode element 123a, so that the voltage of the node (A) is increased. In contrast, current does not flow to the diode element 123b because its connection direction is opposite to the direction of the potential difference. The diode element 123a is set to be in an off state when the voltage of the node (A) exceeds −Vth(a), supply of current is stopped, and voltage whose level is close to the level of −Vth(a) is held in the node (A).

The comparison circuit 127 compares the voltage of the node (A) with the reference voltage Vref and outputs RXDATA based on the comparison result as described above. The comparison circuit 127 in this embodiment outputs low-level voltage as RXDATA in the case where the voltage of the node (A) is lower than the reference voltage Vref.

With such a structure, data on the direction of a potential difference generated in a coil can be held in a node between a parallel circuit and a comparison circuit and can be output as a receiving signal.

Here, in the case where the potential difference VR generated between both of the ends of the coil is small, the voltage held in the node (A) does not reach the threshold voltage of the diode element in some cases. Although the minimum level of VR at which the receiving circuit operates normally varies depending on the structure of the comparison circuit, in the case of the receiving circuit 120 in this embodiment, the minimum level of VR needs to be higher than Vth(a) and Vth(b). In the case where the threshold voltages of the two diode elements are different from each other, it should be noted that voltages whose absolute values are different from each other might be held in the node (A) depending on the direction of voltage generated in the coil.

Note that although the coupling factor between the coils is positive in this embodiment, in the case where the coupling factor between the coils is negative, the direction of the voltage generated in the coil and a receiving signal which is output are inverted. In the case where the inverted receiving signal is inconvenient, for example, an inverter is provided on an input side or an output side of the comparison circuit so that the receiving signal can be inverted again.

Note that although the parallel circuit includes two diodes in this embodiment, the number of diodes is not limited to thereto. A plurality of diodes connected in series may be connected in parallel and their directions may be opposite. In that case, threshold voltage at which the parallel circuit starts to supply current is the sum of the threshold voltages of the diodes connected in series. Thus, higher voltage can be held in the node between the parallel circuit and the comparison circuit. Consequently, the influence of a decrease in voltage due to the leakage current of the diode can be suppressed and an interval between input of pulse voltage can be increased. Thus, the receiving circuit can be applied to a low-frequency transmitting signal.

A receiving circuit with such a structure has a simple circuit structure and is suitable for reduction in circuit scale and circuit size. Thus, when such a receiving circuit is used as, for example, a receiving circuit in an LSI chip, it is possible to obtain an LSI chip where the chip size is reduced and wireless communication can be performed. In addition, in the case where a plurality of receiving circuits are provided in one chip and a plurality of signals are transmitted and received concurrently, the use of the receiving circuit of the present invention leads to reduction in the circuit size.

This embodiment can be combined with any of the other embodiments and an example disclosed in this specification as appropriate.

(Embodiment 2)

In this embodiment, a structure where a transistor whose leakage current is markedly reduced is used as the diode element in the receiving circuit in Embodiment 1 is described with reference to FIG. 3, FIG. 4, and FIGS. 5A to 5D.

<Structure Example of Circuit>

Figure 3:
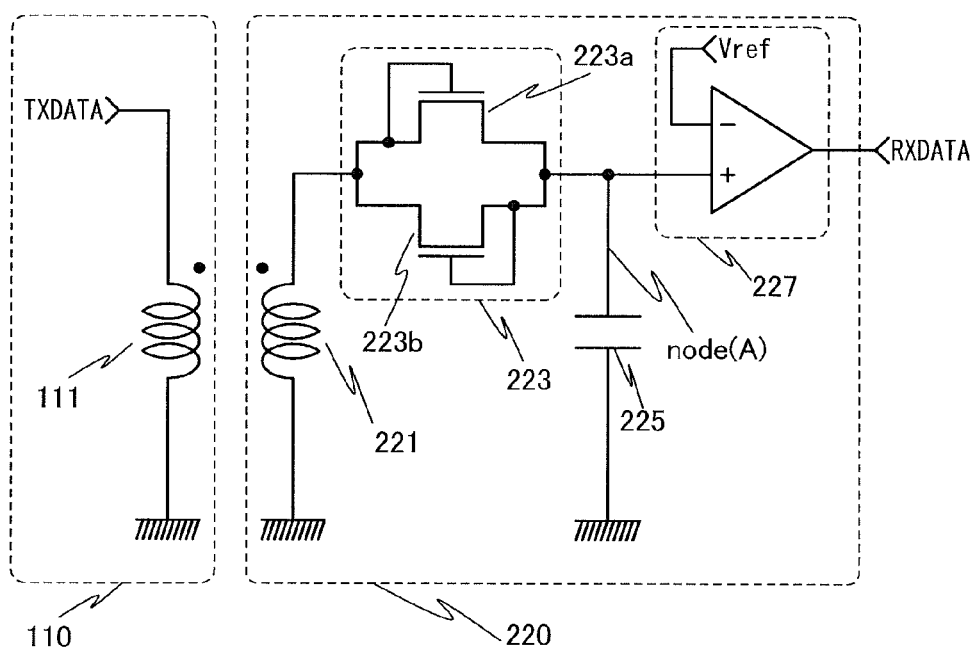
FIG. 3 illustrates a receiving circuit in one embodiment of the present invention.

FIG. 3 illustrates structure examples of the transmitting circuit 110 and a receiving circuit 220 in this embodiment.

The transmitting circuit 110 has the same structure as that in Embodiment 1. The receiving circuit 220 has a structure which is similar to that of the receiving circuit 120 in Embodiment 1 except that the diode element 123a and the diode element 123b in the parallel circuit 123 are replaced with a transistor 223a and a transistor 223b, respectively. In other words, a coil 221, a capacitor 225, and a comparison circuit 227 are similar to the coil 121, the capacitor 125, and the comparison circuit 227 in the receiving circuit 120, respectively.

A parallel circuit 223 includes the transistor 223a and the transistor 223b. A gate and a first electrode of the transistor 223a are connected to one terminal of the coil 221. A second electrode of the transistor 223a is connected to the comparison circuit 227 and one electrode of the capacitor 225. A gate and a first electrode of the transistor 223b are connected to the comparison circuit 227 and the one electrode of the capacitor 225. A second electrode of the transistor 223b is connected to the one terminal of the coil 221. Thus, the gate and the first electrode of the transistor are connected to each other, so that the transistor serves as a diode element.

A transistor whose leakage current in an off state is markedly reduced may be used as each of the transistor 223a and the transistor 223b. As such a transistor, for example, a transistor whose semiconductor layer in which a channel is fowled includes an oxide semiconductor can be used. In contrast, for a different semiconductor element such as a transistor included in the circuit, a semiconductor such as single crystal silicon may be used.

In particular, in the case of an oxide semiconductor with a bandgap of three electron volts or more, by making the concentration of donors or acceptors $1\times10^{12}$ cm$^{-3}$ or lower, off-state resistance can be extremely high. For example, by optimizing the potential of a gate of such a transistor, resistance between a source and a drain can be $1\times10^{24} \Omega$ or higher. Thus, even in the case of a diode-connected transistor, for example, leakage current in an off state can be markedly reduced as compared to a transistor whose semiconductor layer includes silicon.

When the receiving circuit 220 includes such a transistor, the leakage current of the parallel circuit 223 is markedly reduced; thus, the period during which voltage can be held in the node (A) can be markedly lengthened. Thus, an element whose size is small can be used for the capacitor 225, so that the circuit size can be further reduced. Further, the time required for charging and discharging of the node (A) is shortened when a capacitance component is decreased, so that the receiving circuit can be applied to a high-frequency transmitting signal. Furthermore, since voltage can be held in the node (A) for an extremely long time, the receiving circuit can be applied to an extremely low-frequency signal. In other words, when such a transistor is used in a receiving circuit, the circuit size can be reduced and a receiving circuit applicable to a wide frequency band can be obtained.

Next, a specific structure example of the receiving circuit 220 is described with reference to FIG. 4.

Figure 4:
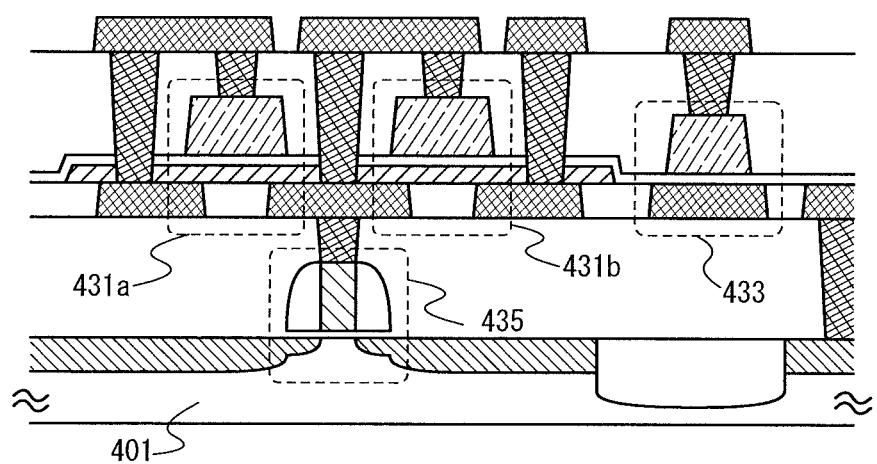
FIG. 4 is a cross-sectional schematic diagram of a receiving circuit in one embodiment of the present invention.

FIG. 4 is a cross-sectional schematic diagram where a transistor 431a, a transistor 431b, a transistor 435, and a capacitor 433 are formed on a single crystal semiconductor substrate 401.

The transistor 431a corresponds to the transistor 223a in the receiving circuit 220, and a gate and one of a source and a drain of the transistor 431a are connected to each other. The transistor 431b corresponds to the transistor 223b, and a gate and one of a source and a drain of the transistor 431b are connected to each other similarly. Here, a wiring which is connected to the gate and the one of the source and the drain of the transistor 431b corresponds to the node (A) in the receiving circuit 220.

The transistor 435 corresponds to a transistor provided in an input portion of the comparison circuit 227. In this embodiment, a gate of the transistor 435 is connected to the node (A). Note that a contact plug which is connected to a source or a drain of the transistor 435 is not illustrated for clarity. FIG. 4 and FIGS. 5A to 5D (to be described later) illustrate parts of contact plugs which are connected to different transistors in the comparison circuit 227 and first wirings.

The capacitor 433 corresponds to the capacitor 225 in the receiving circuit 220 and is connected to the node (A) through a wiring whose upper or lower electrode is not illustrated. The capacitor is formed using the same material as the first wiring, gate insulating layers of the transistor 431a and the transistor 431b, and a gate line that are described later. Note that the capacitor does not necessarily have this structure. The capacitor may have an impurity region formed in the single crystal semiconductor substrate 401, a second wiring, or the like as an electrode.

Note that although the cross-sectional schematic diagrams in FIG. 4 and FIGS. 5A to 5D illustrate the case where the transistor 431a and the transistor 431b are formed directly on the transistor 435 for clarity, this embodiment is not limited to this structure.

The relative position of the transistor 431a, the transistor 431b, and the transistor 435 may be determined as appropriate by leading a wiring for connecting these transistors, for example.

Further, although the cross-sectional schematic diagrams in FIG. 4 and FIGS. 5A to 5D do not illustrate the coil 221, the coil can be formed at the same time as the first wiring, the gate line, or the second wiring by using a low-resistance material such as copper for any one of the first wiring, the gate line, and the second wiring. Resistance can be further reduced when two or more of these wirings which are connected to each other by a contact plug are used. Alternatively, an external coil may be connected as the coil.

<Example of Manufacturing Step>

Next, examples of manufacturing steps are sequentially described with reference to FIGS. 5A to 5D. First, by a known semiconductor processing technique, an element isolation layer 403 is formed on one surface of the substrate 401 of a single crystal semiconductor such as silicon or gallium arsenide, and impurity regions 407a to 407c and a gate 405 of the transistor are formed. In addition, a first interlayer insulating layer 409 is formed and first contact plugs 411a and 411b are formed (see FIG. 5A). A silicide layer or the like may be provided on surfaces of the impurity regions 407a to 407c so that conductivity is increased.

Figure 5A:
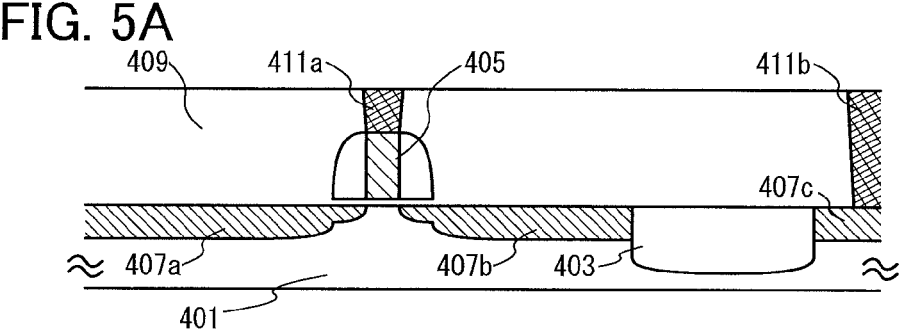
FIGS. 5A to 5D illustrate a method for &Inning a receiving circuit in one embodiment of the present invention.
Figure 5B:
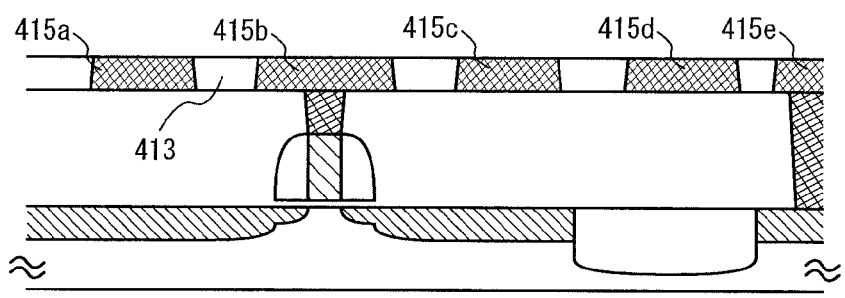

Then, a first embedded insulating layer 413 and first wirings 415a to 415e are formed (see FIG. 5B). For the first wirings 415a to 415e, copper may be used so that conductivity is increased. In that case, the first wirings 415a to 415e are preferably formed by damascene. Note that top surfaces of the first wirings 415a to 415c are in direct contact with an oxide semiconductor to be formed later; thus, the first wirings are preferably formed using a material suitable for the purpose. For example, it is preferable to use a material whose work function is lower than the electron affinity of the oxide semiconductor, such as titanium or titanium nitride.

Then, an oxide semiconductor layer 417 is formed. An oxide semiconductor in which indium accounts for 20 at. % or more of all the metal elements is preferably used as the oxide semiconductor. At the time of formation, attention needs to be paid to prevent mixing of hydrogen, and the oxide semiconductor is preferably deposited by sputtering with hydrogen and water in an atmosphere, in a target, and on surfaces of the target and a device sufficiently reduced. After the oxide semiconductor is deposited, heat treatment may be performed in an atmosphere from which water and hydrogen are reduced so that water and hydrogen in the film are eliminated.

As the oxide semiconductor layer, an oxide semiconductor layer having a crystal region which is c-axis-aligned perpendicularly to a surface of the film may be formed by performing deposition twice and heat treatment twice, regardless of the material of a base member, such as an oxide, a nitride, or a metal. For example, after a first oxide semiconductor film with a thickness of 3 to 15 nm is deposited, first heat treatment is performed at 450 to 850° C., preferably 550 to 750° C. in the atmosphere of nitrogen, oxygen, a rare gas, or dry air, so that a first oxide semiconductor film which includes a crystalline region (including plate-like crystals) in a region including its surface is formed. Then, after a second oxide semiconductor film which has a larger thickness than the first oxide semiconductor film is formed, second heat treatment is performed at 450 to 850° C., preferably 600 to 700° C., so that crystal growth proceeds upward with the use of the first oxide semiconductor film as a seed of the crystal growth and the entire second oxide semiconductor film is crystallized. In such a manner, the oxide semiconductor layer having a thick crystal region may be formed. Note that in that case, a material that can withstand the temperature of heat treatment is used as the material of a contact plug and a wiring.

Further, an oxide semiconductor layer having a crystal region which is c-axis-aligned perpendicularly to a surface of the film may be formed by deposition of an oxide semiconductor layer while the substrate is heated to a temperature at which the oxide semiconductor is c-axis aligned. With such a deposition method, the process can be shortened. The temperature for heating the substrate may be set as appropriate in accordance with other deposition conditions which differ depending on a deposition apparatus. For example, when the deposition is performed with a sputtering apparatus, the substrate temperature may be higher than or equal to 250° C.

Further, a gate insulating layer 419 is formed. As the material of the gate insulating layer 419, silicon oxide, silicon oxynitride, aluminum oxide, hafnium oxide, zirconium oxide, or the like can be used. The thickness of the gate insulating layer 419 is preferably 6 to 20 nm, more preferably 10 to 16 nm.

Figure 5C:
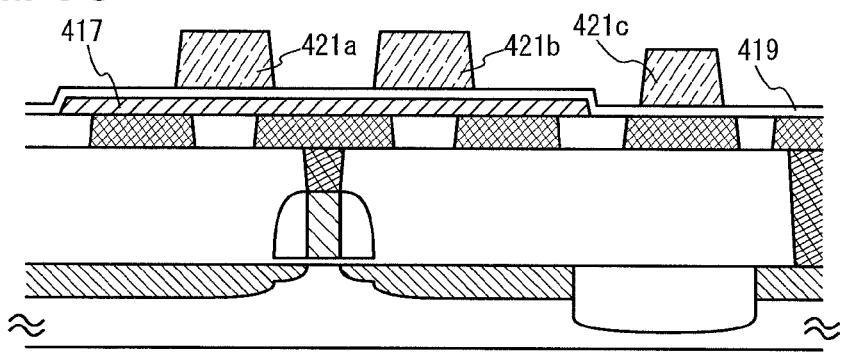

Then, gate lines 421a to 421c are formed (see FIG. 5C). As the material of the gate lines 421a to 421c, a material whose work function is higher than the electron affinity of the oxide semiconductor, such as tungsten, nickel, palladium, osmium, or platinum is preferably used. Alternatively, only parts of the gate lines 421a to 421c that are in contact with the gate insulating layer 419 may be formed using such a material.

Through the above steps, the transistor 431a, the transistor 431b, the transistor 435, and the capacitor 433 are formed.

Figure 5D:
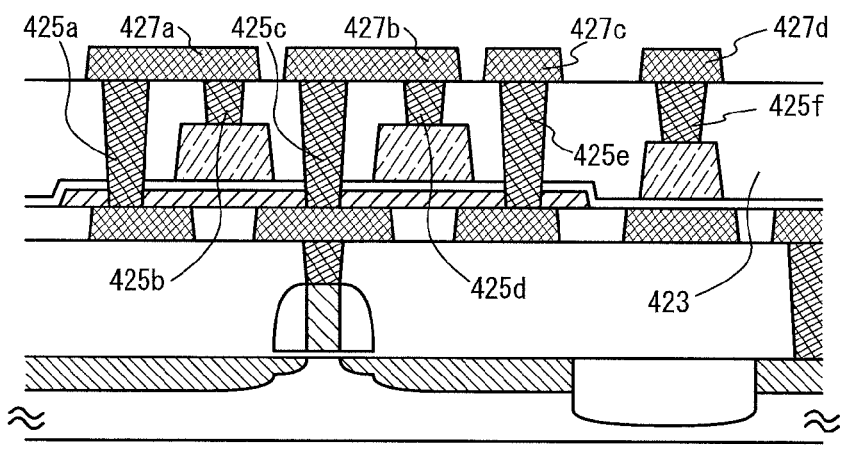

Next, a second interlayer insulating layer 423 and second contact plugs 425a to 425f are formed, and then second wirings 427a to 427d are formed (see FIG. 5D). As the material of the second wiring, a material which is similar to the material of the first wiring can be used.

When the second wiring 427a is formed to be connected to the first wiring 415a and the gate line 421a, the transistor 431a can be diode-connected. Similarly, when the second wiring 427b is formed to be connected to the first wiring 415b and the gate line 421b, the transistor 431b can be diode-connected.

The first wiring 415d that is a lower electrode of the capacitor 433 may be connected to the first wiring 415b over the same layer, or the second wiring 427d connected to the gate line 421c that is an upper electrode of the capacitor 433 may be connected to the second wiring 427b. In addition, the first wiring 415d and the second wiring 427b, or the second wiring 427d and the first wiring 415b may be connected to each other with a contact plug. In that case, the other electrode which is not connected to the wiring corresponding to the node (A) is connected to a ground potential line (not illustrated).

Through the above steps, the transistor 223a, the transistor 223b, the capacitor 225, the coil 221, and part of the comparison circuit 227 in the receiving circuit 220 can be formed.

Each of the transistor 431a and the transistor 431b formed in this manner can be a transistor whose leakage current in an off state is markedly reduced. Thus, when such a transistor is used as the diode element in the receiving circuit 220, the circuit size can be reduced and a receiving circuit applicable to a wide frequency band can be obtained.

This embodiment can be combined with any of the other embodiments and the example disclosed in this specification as appropriate.

(Embodiment 3)

In this embodiment, an example of an LSI chip including a receiving circuit in one embodiment of the present invention is described with reference to FIG. 6.

Figure 6:
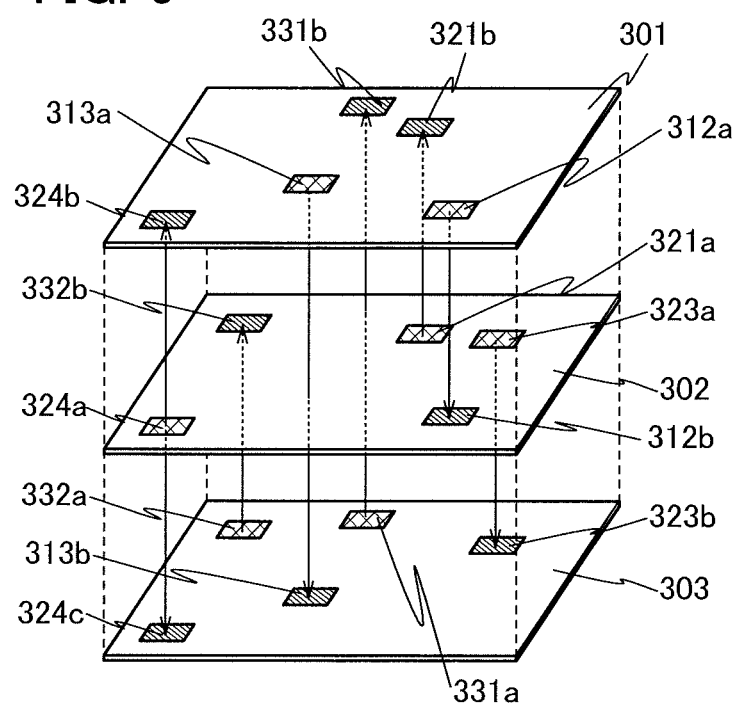
FIG. 6 illustrates an LSI chip in one embodiment of the present invention.

FIG. 6 is a schematic diagram illustrating the structures of three LSI chips which are stacked and signal transmission and reception in the three LSI chips. LSI chips 301 to 303 illustrated in FIG. 6 each include a plurality of receiving circuits and a plurality of transmitting circuits. Arrows in FIG. 6 show the directions of signals transmitted from the transmitting circuit to the receiving circuit.

Signals are transmitted and received between a set of transmitting and receiving circuits in each LSI chip. Thus, in the case where the LSI chips are stacked, it is preferable that coils of the set of transmitting and receiving circuits substantially overlap with each other because a coupling factor between the coils can be increased. The size and shape of the coils of the transmitting and receiving circuits may be set as appropriate in accordance with the size of the LSI chip or the distance between the LSI chips which are stacked. For example, a coil whose diagonal is ten to several hundred micrometers may be used.

A power supply line for supplying power supply voltage is connected to each LSI chip. Alternatively, the following structure may be used: a signal such as a sine wave for supplying power is transmitted from an LSI chip connected to the power supply line, the signal is received by a different LSI chip, and then power supply voltage is generated by a rectifier circuit, a constant voltage circuit, or the like.

In addition, a wiring for inputting a clock signal for synchronizing the operations of the LSI chips is connected. Alternatively, the following structure may be used: an LSI chip transmits such a clock signal, a different LSI chip receives the signal, and the operations of the LSI chips are synchronized.

Between the LSI chip 301 and the LSI chip 302, a signal is transmitted from a transmitting circuit 312a to a receiving circuit 312b, and a signal is transmitted from a transmitting circuit 321a to a receiving circuit 32 lb. In addition, between the LSI chip 302 and the LSI chip 303, a signal is transmitted from a transmitting circuit 323a to a receiving circuit 323b, and a signal is transmitted from a transmitting circuit 332a to a receiving circuit 332b. Further, between the LSI chip 301 and the LSI chip 303, a signal is transmitted from a transmitting circuit 313a to a receiving circuit 313b, and a signal is transmitted from a transmitting circuit 331a to a receiving circuit 331b.

As illustrated in FIG. 6, when signals transmitted from a transmitting circuit 324a in the LSI chip 302 are received by a receiving circuit 324b and a receiving circuit 324c, the LSI chip 301 and the LSI chip 303 can receive the same signals.

When a plurality of LSI chips are stacked in this manner so that a transmitting circuit and a receiving circuit overlap with each other, communication can be performed without leading of a wiring even when a different LSI chip is provided between the LSI chips.

Although three LSI chips are stacked in this embodiment, this embodiment is not limited to this structure. Two LSI chips or four or more LSI chips may be stacked.

In the case where four LSI chips are stacked, a plurality of sets of transmitting and receiving circuits where coils have different shapes overlap with each other, so that the increase in chip size can be suppressed. For example, the coil of one set of transmitting and receiving circuits is formed to have one loop, and the coil of the other set of transmitting and receiving circuits has two loops so that the magnetic field strengths of magnetic fields generated by the coils are equal and that the phases of the magnetic fields are opposite. Such two kinds of coils are not interfered by magnetic fields generated by the coils even when they overlap with each other. Thus, even when two or more sets of transmitting and receiving circuits overlap with each other, communication can be performed without a malfunction.

Note that as the LSI chip, a thin film transistor formed over a thin film of resin or the like may be used. The thickness of such an LSI chip can be as small as several micrometers to several tens of micrometers. Thus, by provision of a receiving circuit and a transmitting circuit in the LSI chip, a coupling factor between coils can be increased. Consequently, the coil size can be reduced and wireless communication can be performed with low power consumption, which is preferable. Such a thin film LSI chip can be formed, for example, directly over a heat-resistant resin substrate, or can be formed by formation of an LSI chip over a glass substrate provided with a separation layer and then separation of the LSI chip and transfer of the LSI chip over a thin film of resin or the like.

When the receiving circuit in the above embodiment is used as a receiving circuit including such an LSI chip, it is possible to obtain a stack of LSI chips where the chip size is reduced and wireless communication can be performed. Further, when a plurality of the receiving circuits are provided in an LSI chip, the size of the LSI chip can be effectively reduced.

This embodiment can be combined with any of the other embodiments and the example disclosed in this specification as appropriate.

(Embodiment 4)

In this embodiment, as an example of a storage medium including a receiving circuit in one embodiment of the present invention, a structure example of a memory card is described with reference to FIGS. 7A and 7B.

Figure 7A:
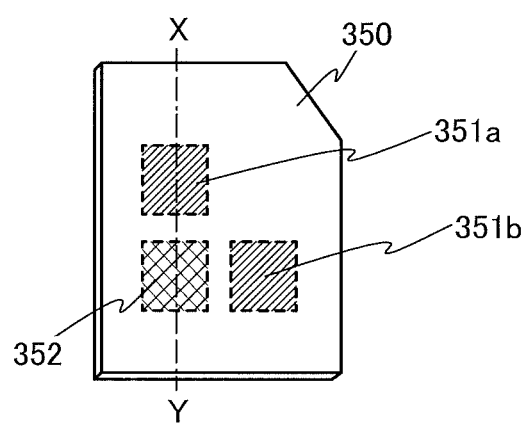
FIGS. 7A and 7B illustrate a memory card in one embodiment of the present invention.

FIG. 7A is a schematic diagram of a memory card 350 illustrated in this embodiment. The memory card 350 includes two receiving circuits (a receiving circuit 351a and a receiving circuit 351b) and one transmitting circuit (a transmitting circuit 352).

The receiving circuit 351a receives a signal for generating power supply voltage. The receiving circuit 351b receives a data signal from an electronic device. The transmitting circuit 352 transmits data or the like written to the memory card to the electronic device.

The memory card 350 includes a control circuit (not illustrated) and is connected to the receiving circuit 351a, the receiving circuit 351b, and the transmitting circuit 352. The control circuit controls operation such as writing and reading data to and from a memory element that is described later in accordance with a signal received by the receiving circuit 351a and the receiving circuit 351b and controls the operation of the transmitting circuit 352 so that the transmitting circuit 352 outputs a transmitting signal as needed.

The memory card 350 includes a memory element, and data can be written to the memory card 350 in accordance with a write signal from the electronic device. The data written to the memory card 350 can be read in accordance with a read signal from the electronic device. As the memory element of the memory card 350, a programmable and erasable memory such as a flash memory, a ferroelectric random access memory, a magnetoresistive random access memory, a phase-change memory, or a resistive random access memory; or a nonvolatile memory such as a one time programmable (OTP) memory can be used. Alternatively, in the case where a power source such as a battery is mounted on the memory card, a volatile memory such as an SRAM or a DRAM may be used.

Figure 7B:
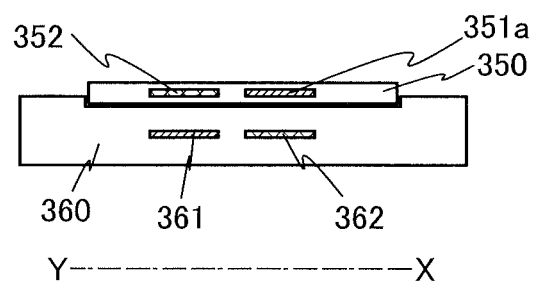

FIG. 7B is a cross-sectional schematic diagram at the time when signals are transmitted and received between an electronic device 360 and the memory card 350. A chain line X-Y in FIG. 7B corresponds to a chain line X-Y in FIG. 7A.

The electronic device 360 includes a receiving circuit 361 and a transmitting circuit 362, and a transmitting circuit (not illustrated). The electronic device 360 has a hollow so that the receiving circuits 351a and 351b and the transmitting circuit 352 in the memory card 350 overlap with the transmitting circuit 362, the transmitting circuit (not illustrated), and the receiving circuit 361 in the electronic device 360 in a communicable range.

With the use of such a memory card and an electronic device, an area can be markedly reduced by elimination of an exposed portion of a contact electrode, and further reduction in the size of the memory card can be achieved. In addition, since the exposed electrode is not needed, the memory card can be covered with resin or the like and can be totally waterproof, and a slot into which a card is inserted can be eliminated from the electronic device, which is advantageous.

Note that although the memory card includes two receiving circuits and one transmitting circuit in this embodiment, the number of these circuits is not limited thereto. For example, when a plurality of receiving circuits are provided and signals are received concurrently, the speed of transmission and reception of signals can be increased.

Although the transmitting circuits and the receiving circuits of the memory card and the electronic device are placed in a line in this embodiment, as described in Embodiment 3, these circuits may be stacked by varying the shapes of the coils.

Although the electronic device has the hollow so that the relative position of the memory card and the electronic device is aligned in this embodiment, any structure may be used as long as the relative position is kept aligned. For example, the memory card may have a hollow and an electronic device may be provided with a projection whose shape fits the hollow.

Although the memory card has a notch portion at one end so that the inside and outside of the memory card and the direction of the memory card are clear in this embodiment, the memory card may have any structure as long as the inside and outside of the memory card and the direction of the memory card are clear. For example, a depression and a projection may be provided on a surface of the memory card, or a character or a sign may be used.

By application of the receiving circuit in the above embodiment to a receiving circuit including such a memory card, it is possible to obtain a memory card where the size is smaller than the size of a conventional memory card and wireless communication can be performed. By application of the receiving circuit in the above embodiment to a receiving circuit of an electronic device, the size of the electronic device can be reduced. By provision of a plurality of the receiving circuits, the size of the memory card or the electronic device can be effectively reduced.

This embodiment can be combined with any of the other embodiments and the example disclosed in this specification as appropriate.

EXAMPLE 1

Figure 8:
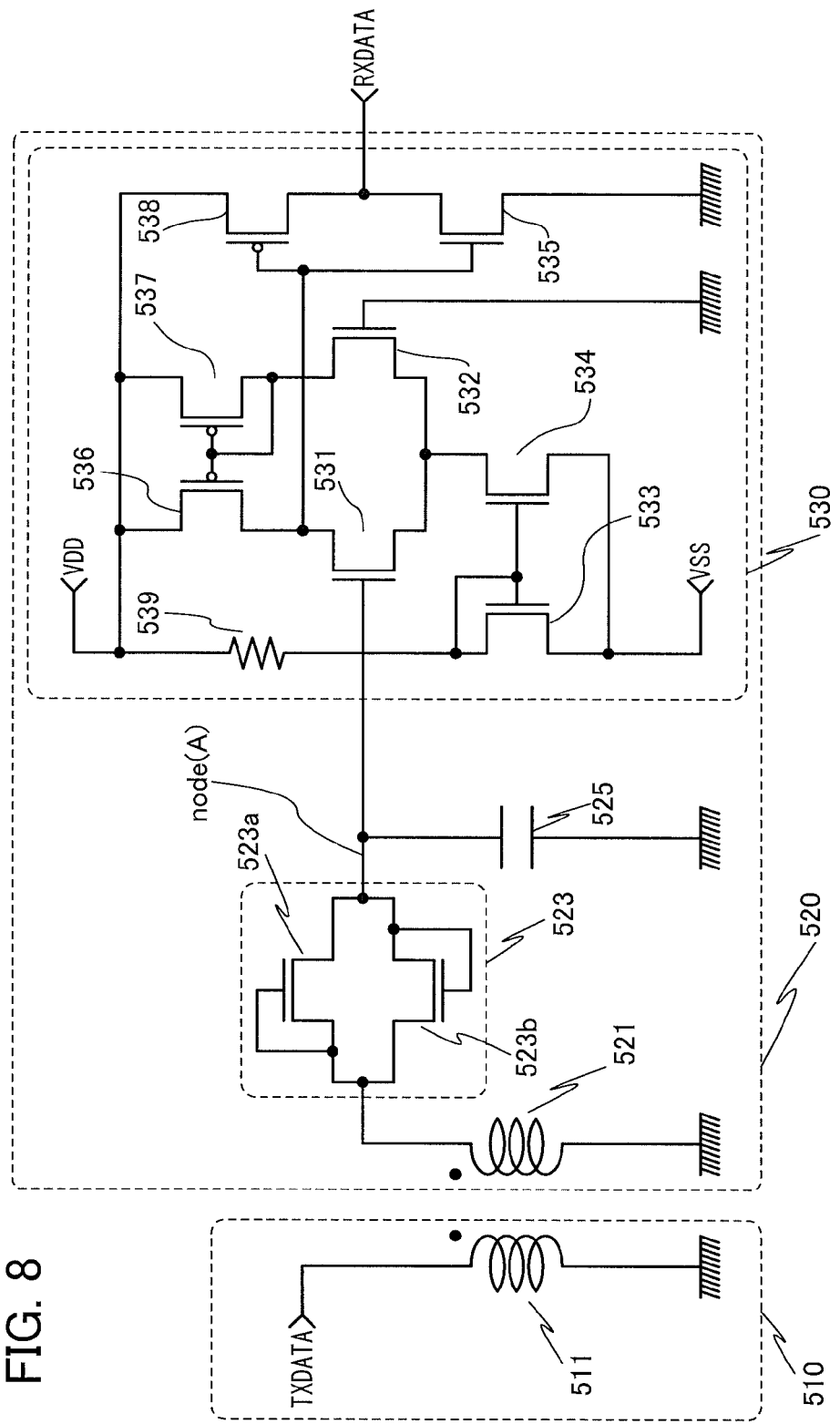
FIG. 8 is a circuit diagram of a receiving circuit in an example of the present invention.

In this example, calculation results of input-output characteristics under the assumption of the use of the receiving circuit in Embodiment 1 are described with reference to FIG. 8 and FIGS. 9A to 9D. FIG. 8 is a circuit diagram illustrating a circuit model used for the calculation of input-output characteristics in this example. FIGS. 9A to 9D show calculation results of transition of input-output voltage and circuit internal voltage.

<Circuit Structure>

First, a circuit used for the calculation in this example is described with reference to FIG. 8. The structures of a transmitting circuit and a receiving circuit are similar to the structures of the transmitting circuit 110 and the receiving circuit 220 in FIG. 3 except for a transmitting circuit 510 and a comparison circuit in a receiving circuit 520; thus, description thereof is omitted and only a comparison circuit 530 is described here.

A node (node (A)) to which a parallel circuit 523 and a capacitor 525 are connected is input to the comparison circuit 530.

The comparison circuit 530 includes eight transistors (transistors 531 to 538) and one resistor (a resistor 539). A gate of the transistor 531 is connected to the node (A). A first electrode of the transistor 531 is connected to a second electrode of the transistor 536 and gates of the transistors 535 and 538. A second electrode of the transistor 531 is connected to a first electrode of the transistor 534 and a second electrode of the transistor 532. A gate of the transistor 532 is grounded. A first electrode of the transistor 532 is connected to a gate of the transistor 536 and a gate and a second electrode of the transistor 537. A gate and a first electrode of the transistor 533 are connected to a second terminal of the resistor 539 and a gate of the transistor 534. A second electrode of the transistor 533 is connected to a low voltage power supply line VSS. A second electrode of the transistor 534 is connected to the low voltage power supply line VSS. A first electrode of the transistor 535 is connected to a second electrode of the transistor 538. A second electrode of the transistor 535 is grounded. First electrodes of the transistors 536, 537, and 538 are connected to a high voltage power supply line VDD. A first terminal of the resistor 539 is connected to the high voltage power supply line VDD.

Here, the transistors 531 to 535 are n-channel transistors, and the transistors 536 to 538 are p-channel transistors.

Here, the receiving signal RXDATA is output from a node between the second electrode of the transistor 538 and the first electrode of the transistor 535.

Thus, the comparison circuit 530 has a combination of a differential amplifier circuit and an inverter circuit. Reference voltage depends on voltage input to the gate of the transistor 532. In this example, a ground potential (0 V) is the reference voltage.

<Result of Input-Output Characteristics>

Next, the characteristics of input-output voltage and circuit internal voltage that are calculated using the circuit in FIG. 8 are described.

In this example, calculation was performed under the assumption that the threshold voltage of an n-channel transistor was 0.5 V and the threshold voltage of a p-channel transistor was −0.5 V. Although description of the details of other characteristics of the transistors is omitted, transistors containing polycrystalline silicon in semiconductor layers were formed, and values estimated from measured values were used. The capacitance value of the capacitor 525 was 0.3 pF, and the resistance value of the resistor 539 was 1.6 MΩ. The inductance of the coils 511 and 521 was 10 nH, a resistance component was 0.1 QΩ, and a coupling factor of the coils was 0.7. Voltages input to the high voltage power supply line VDD and the low voltage power supply line VSS were 3 V and −3 V, respectively.

Figure 9A:
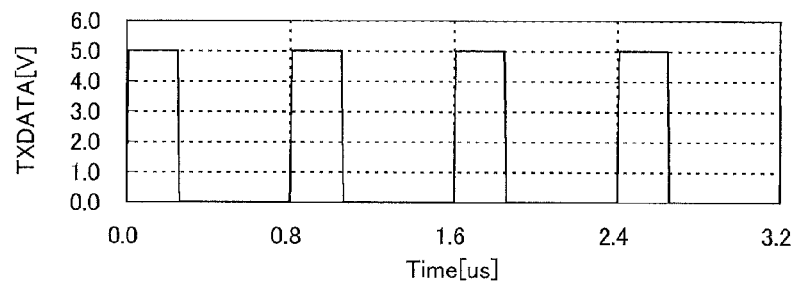
FIGS. 9A to 9D illustrate calculation results of input-output characteristics of a receiving circuit in the example of the present invention.
Figure 9B:
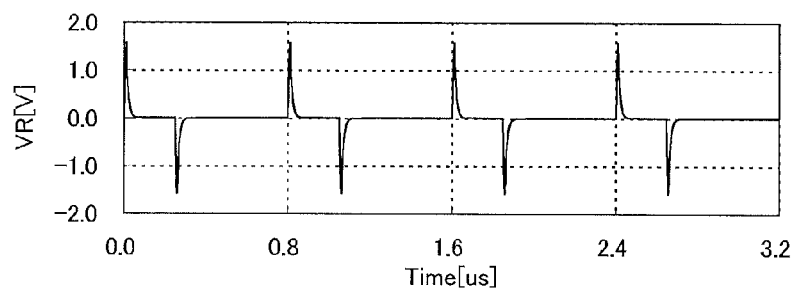
Figure 9C:
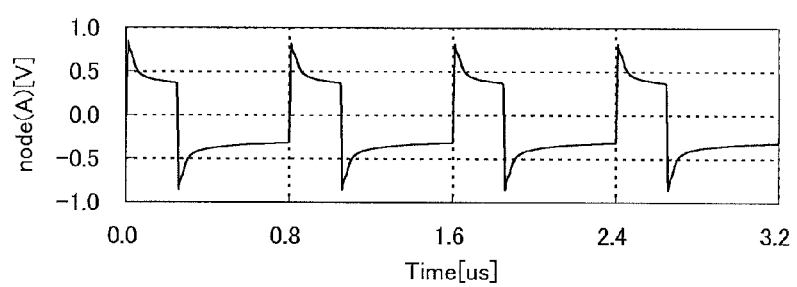
Figure 9D:
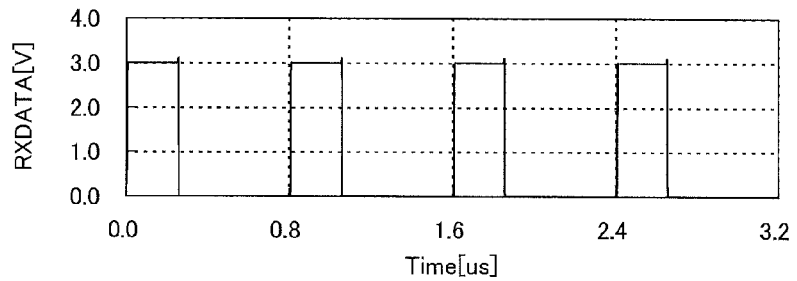
Figure 10:
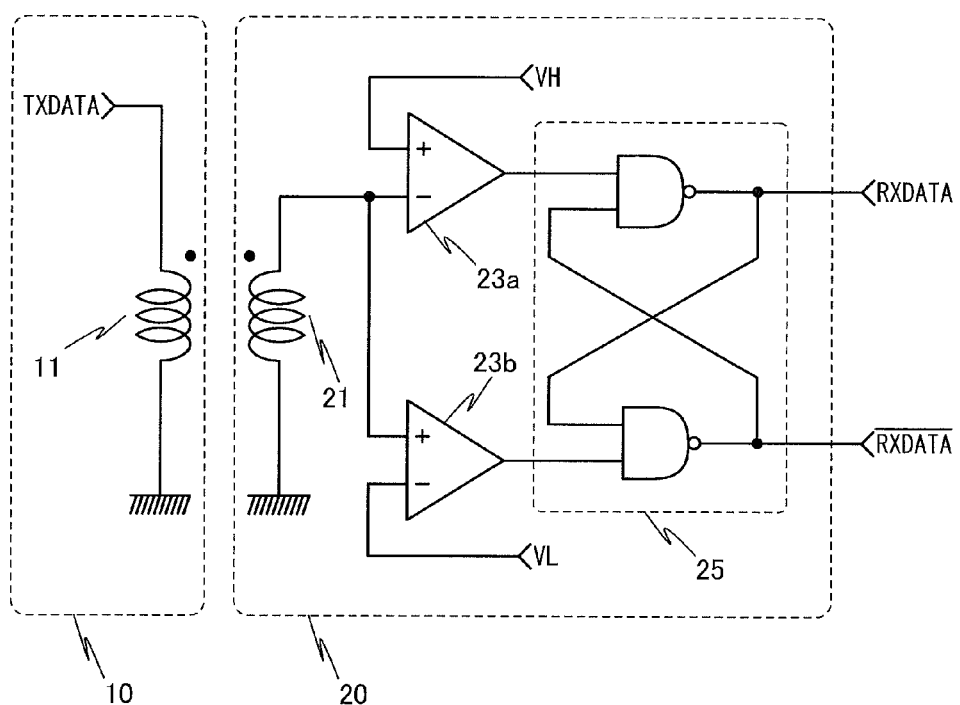
FIG. 10 illustrates a structure example of a conventional receiving circuit.
Figure 11A:
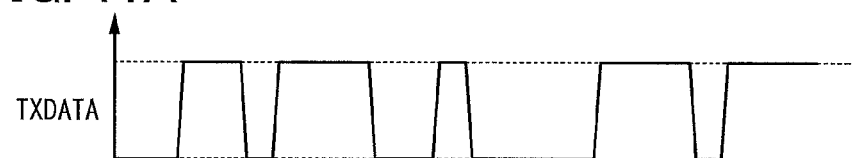
FIGS. 11A to 11C are timing charts of the conventional receiving circuit.
Figure 11B:
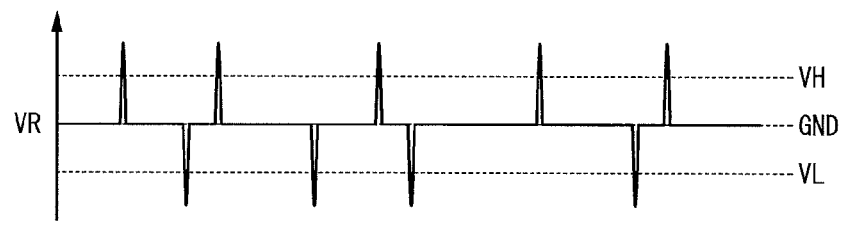
Figure 11C:
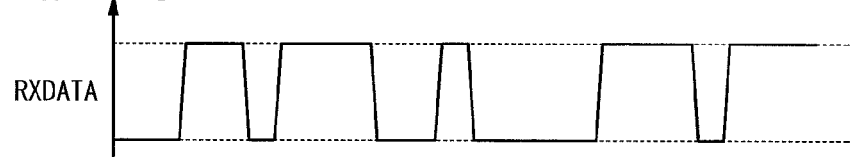

FIG. 9A illustrates transition of the voltage of the transmitting signal TXDATA output to the coil 511 in the transmitting circuit 510 over time. FIG. 9B illustrates transition of the potential difference VR generated in the coil 521 over time. FIG. 9C illustrates transition of the voltage of the node (A) over time. FIG. 9D illustrates transition of the voltage of the receiving signal RXDATA output from the comparison circuit 530 over time.

As the transmitting signal TXDATA, as illustrated in FIG. 9A, a rectangular wave with a width of 0.25 μs, a cycle of 0.8 μs, and an amplitude of 5 V was used. In response to the rise and fall of the transmitting signal TXDATA, the pulsed potential difference VR with an amplitude of 1.5 V was generated between both ends of the coil 521, as illustrated in FIG. 9B. The voltage of the node (A) was sharply increased as illustrated in FIG. 9C by the potential difference VR and then was decreased; however, it was confirmed that voltage whose absolute value is approximately 0.35 V was held. Consequently, it was confirmed that a rectangular wave whose cycle and width are substantially the same as TXDATA and whose amplitude is 3 V was output as the receiving signal RXDATA that is an output from the comparison circuit 530.

The results show that the receiving circuit in one embodiment of the present invention can normally restore a transmitting signal from a transmitting circuit as a receiving signal though it has an extremely simple circuit structure.

This example can be combined with any of the embodiments disclosed in this specification as appropriate.

This application is based on Japanese Patent Application serial No. 2010-243220 filed with Japan Patent Office on Oct. 29, 2010, the entire contents of which are hereby incorporated by reference.

What is claimed is:

1. A receiving circuit comprising:
    a parallel circuit comprising at least two diode elements whose directions are opposite are electrically connected in parallel;
    a coil whose one end is electrically connected in series with one end of the parallel circuit and the other end is connected to grounded;
    a capacitor whose one end is electrically connected in series with the other end of the parallel circuit and the other end is connected to grounded; and
    a comparison circuit for detecting voltage of a node to which the parallel circuit and the capacitor are electrically connected.

2. The receiving circuit according to claim 1, wherein each of the at least two diode elements comprises a transistor whose threshold voltage is positive and a semiconductor layer used for a channel of the transistor includes an oxide semiconductor.

3. The receiving circuit according to claim 1,
    wherein one of the at least two diode elements comprises first transistor and the other comprises second transistor;
    wherein a gate electrode and a first electrode of the first transistor are electrically connected to one terminal of the coil, and a second electrode of the first transistor is electrically connected to the comparison circuit and one electrode of the capacitor; and
    wherein a gate electrode and a first electrode of the second transistor are electrically connected to the comparison circuit and the one electrode of the capacitor, and the second electrode of the second transistor is electrically connected to the one terminal of the coil.

4. An LSI chip comprising the receiving circuit according to claim 1.

5. A storage medium comprising the receiving circuit according to claim 1.

* * * * *